United States Patent
Kanata et al.

(10) Patent No.: US 9,240,575 B2
(45) Date of Patent: Jan. 19, 2016

(54) POWER SUPPLY APPARATUS

(75) Inventors: Yoshio Kanata, Nara (JP); Toshihiro Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 405 days.

(21) Appl. No.: 13/124,158

(22) PCT Filed: Nov. 15, 2010

(86) PCT No.: PCT/JP2010/006697
§ 371 (c)(1),
(2), (4) Date: Jun. 16, 2011

(87) PCT Pub. No.: WO2011/096032
PCT Pub. Date: Aug. 11, 2011

(65) Prior Publication Data
US 2011/0269002 A1 Nov. 3, 2011

(30) Foreign Application Priority Data
Feb. 3, 2010 (JP) .................. 2010-022296

(51) Int. Cl.
*H01M 2/02* (2006.01)
*H01M 10/6551* (2014.01)
(Continued)

(52) U.S. Cl.
CPC .......... *H01M 2/0242* (2013.01); *H01M 10/613* (2015.04); *H01M 10/643* (2015.04);
(Continued)

(58) Field of Classification Search
CPC ............. H01M 10/0525; H01M 10/5004; H01M 10/5016; H01M 10/503; H01M 10/5044; H01M 10/5046; H01M 10/5059; H01M 2/0242; H01M 2/0285; H01M 2/0277; H01M 2/0267; H01M 2/0408; H01M 2/0413; Y02T 10/7011
USPC .............. 429/94, 96, 99–100, 120, 123, 138, 429/149, 152–154, 159, 163–164, 167–168, 429/176, 246
See application file for complete search history.

(56) References Cited

U.S. PATENT DOCUMENTS 4,346,151 A * 8/1982 Uba et al. .................. 429/54
6,849,357 B1 2/2005 Kasahara et al.
(Continued)

FOREIGN PATENT DOCUMENTS

JP 7-22003 A 1/1995
JP 10-106521 A 4/1998
(Continued)

OTHER PUBLICATIONS
Search report from E.P.O., mail date is Jul. 25, 2013.
(Continued)

*Primary Examiner* — Patrick Ryan
*Assistant Examiner* — Ben Lewis
(74) *Attorney, Agent, or Firm* — Greenblum & Bernstein P.L.C.

(57) ABSTRACT

A power supply apparatus includes a formed article having two or more separate accommodating cavities and an electrode group that comprises a rolled up laminate and is accommodated in each of the accommodating cavities, the laminate composed of a cathode and an anode, each having a current collector and mixture layers disposed on the current collector, and a separator sandwiched between the cathode and the anode. An electrolytic solution is accommodated in each of the accommodating cavities, the electrolytic solution, and the anode or the cathode contact the formed article.

13 Claims, 14 Drawing Sheets

(51) Int. Cl.
*H01M 10/643* (2014.01)
*H01M 10/655* (2014.01)
*H01M 10/613* (2014.01)
*H01M 10/0525* (2010.01)
*H01M 10/625* (2014.01)
*H01M 10/6557* (2014.01)

(52) U.S. Cl.
CPC ........ *H01M10/655* (2015.04); *H01M 10/6551* (2015.04); *H01M 2/0285* (2013.01); *H01M 10/0525* (2013.01); *H01M 10/625* (2015.04); *H01M 10/6557* (2015.04); *Y02T 10/7011* (2013.01)

(56) References Cited

U.S. PATENT DOCUMENTS

| | | | |
|---|---|---|---|
| 7,332,244 | B2 | 2/2008 | Uemoto et al. |
| 2003/0013009 | A1 | 1/2003 | Dansui et al. |
| 2003/0064283 | A1* | 4/2003 | Uemoto et al. ............. 429/149 |
| 2005/0022966 | A1 | 2/2005 | Takahashi |
| 2005/0031945 | A1* | 2/2005 | Morita et al. .............. 429/158 |
| 2006/0121341 | A1* | 6/2006 | Hosoda et al. .............. 429/161 |
| 2006/0154138 | A1* | 7/2006 | Miyamoto et al. ........... 429/130 |
| 2006/0172190 | A1* | 8/2006 | Kaplin et al. .............. 429/161 |
| 2008/0206628 | A1 | 8/2008 | Honbou |
| 2010/0279152 | A1* | 11/2010 | Payne .............................. 429/50 |

FOREIGN PATENT DOCUMENTS

| | | |
|---|---|---|
| JP | 2000-108687 A | 4/2000 |
| JP | 2003-109655 A | 4/2003 |
| JP | 2003-249200 A | 9/2003 |
| JP | 2004-503053 A | 1/2004 |
| JP | 2005-56837 A | 3/2005 |
| JP | 2005-285455 A | 10/2005 |
| JP | 2006-107774 A | 4/2006 |
| JP | 2006-310222 A | 11/2006 |
| JP | 2008-210729 A | 9/2008 |
| JP | 2009-54475 A | 3/2009 |

OTHER PUBLICATIONS

Search report from China, mail date is Oct. 21, 2013 along with English language translation thetreof . . . .

* cited by examiner

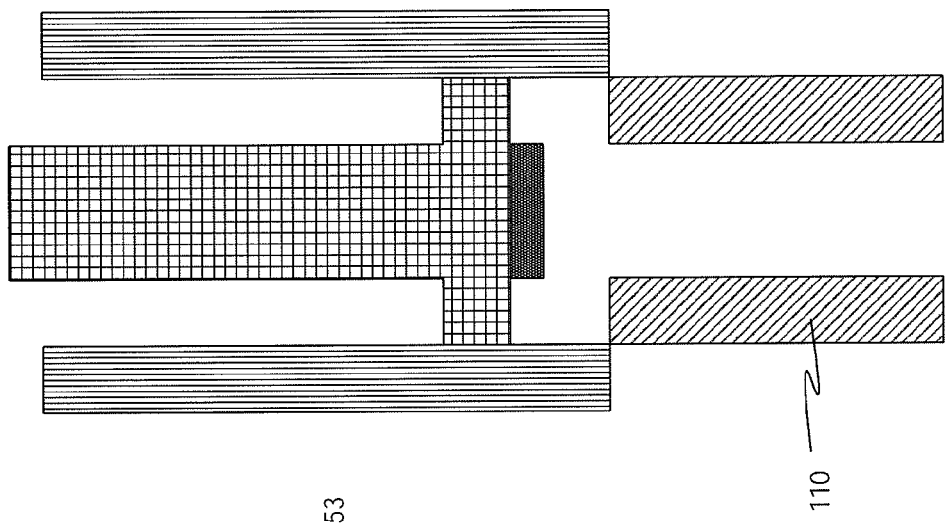
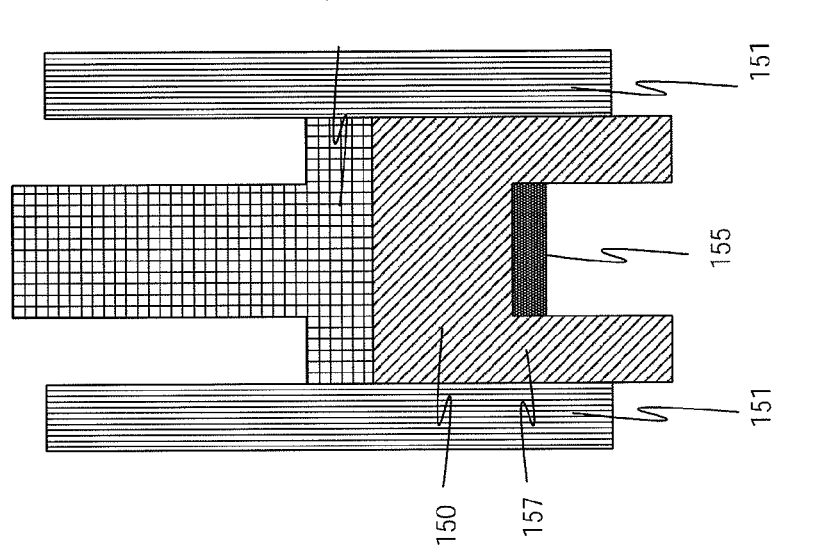

POWER SUPPLY APPARATUS

TECHNICAL FIELD

The present invention relates to a power supply apparatus and a manufacturing method thereof.

BACKGROUND ART

A large current is required to drive a traction motor used in a hybrid car and so forth. For example, when starting or accelerating, a hybrid car requires a huge current equal to or greater than 100 A to drive the traction motor. As this power supply apparatus for supplying a large current, a power supply apparatus including secondary cells with a high energy density, has been known.

In addition, as this power supply apparatus, a power supply apparatus in which a plurality of unit cells, such as nickel-hydrogen batteries, nickel-cadmium batteries or lithium-ion batteries are connected, has been known (for example, see Patent Literatures 1 and 2).

The power supply apparatuses disclosed in Patent Literatures 1 and 2 have a plurality of connected unit cells and a holder to secure these unit cells. The material for the holder is, for example, plastic. Even if one unit cell fails, a power supply apparatus having a plurality of unit cells as described above can supply a current as long as other unit cells work.

However, in the power supply apparatuses as disclosed in Patent Literatures 1 and 2, a material having a low thermal conductivity, such as plastic, is used to fabricate a holder, the heat of unit cells generated during the operation of the power supply apparatus is less likely to be conducted to the holder. Therefore, there has been a problem that heat is accumulated in unit cells during the operation of the power supply apparatus, and therefore the temperature of the unit cells increases.

When the temperature of unit cells increases, the performance of the unit cells decreases, and therefore the performance of the overall power supply apparatus decreases. Meanwhile, if a unit cell is a lithium-ion battery, increase in temperature involves a risk of thermal runaway.

To solve this problem, a technique for enclosing a plurality of connected unit cells with a molded article made of metal such as aluminum having a high thermal conductivity (for example, see Patent Literature 3) has been known.

FIG. 1 is a perspective view showing power supply apparatus 1 disclosed in Patent Literature 3. As shown in FIG. 1, power supply apparatus 1 has molded article 10 having a plurality of unit cell accommodating cavities 11 and unit cells 20 accommodated in unit cell accommodating cavities 11. In addition, molded article 10 has coolant channel 13 that allows coolant for cooling molded article 10 to pass through. Molded article 10 is made of a material such as aluminum having a high thermal conductivity.

In this way, by enclosing unit cells 20 with molded article 10 having a high thermal conductivity, the heat of unit cells 20 generated during the operation of power supply apparatus 1 is conducted to molded article 10 and removed. Therefore, unit cells 20 are cooled to prevent the temperature of unit cells 20 from increasing. In addition, heat conducted to molded article 10 is conducted to coolant flowing through coolant channel 13 and discharged outside.

However, power supply apparatus 1 shown in FIG. 1 has a problem that unit cells 20 are not sufficiently cooled during the operation, and therefore the temperature of unit cells 20 increases. Now, referring to FIG. 2, a cause for increase in temperature of unit cells 20 during the operation of power supply apparatus 1 will be explained. FIG. 2 is an enlarged view showing region X in power supply apparatus 1 shown in FIG. 1.

In power supply apparatus 1, unit cells 20 are accommodated in unit cell accommodating cavities 11, so that the diameter of unit cell accommodating cavity 11 is set greater than the diameter of unit cell 20. Therefore, when unit cell 20 is accommodated in unit cell accommodating cavity 11, gap G occurs between unit cell 20 and the inner wall of unit cell accommodating cavity 11 as shown in FIG. 2. When gap G is formed between unit cell 20 and the inner wall of unit cell accommodating cavity 11, the air between unit cell 20 and unit cell accommodating cavity 11 serves as a heat insulator, so that the heat of unit cell 20 is not conducted to the body. Therefore, heat remains in unit cell 20 to increase the temperature of unit cell 20.

Therefore, even if the heat conductivity of the material for the molded article enclosing unit cells is made high, it is not possible to sufficiently cool the unit cells, and this causes problems of decrease in the performance of unit cells and thermal runaway.

To solve the problem like this, a power supply apparatus has been known where not unit cells, but electrode groups each composed of a cathode, an anode and a separator, and electrolytic solution are directly accommodated in a molded article (see Patent Literature 4). FIG. 3 is an exploded perspective view showing a power supply apparatus disclosed in Patent Literature 4. As shown in FIG. 3, power supply apparatus 1 has electrically conductive molded article 10 having four accommodating cavities 11 and made of aluminum and so forth, and four electrode groups 21 accommodated in accommodating cavities 11. In addition, the inside of molded article 10 is hollow to allow cooling air to pass through. Moreover, in power supply apparatus 1 shown in FIG. 3, electrode groups 21 are serially connected through side plates 31 and 33.

CITATION LIST

Patent Literature

PTL 1
Japanese Patent Application Laid-Open No. 2006-107774
PTL 2
Japanese Patent Application Laid-Open No. 2005-285455
PTL 3
Japanese Patent Application Laid-Open No.HEI10-106521
PTL 4
Japanese Patent Application Laid-Open No. 2003-109655

SUMMARY OF INVENTION

Technical Problem

Like power supply apparatus 1 disclosed in Patent Literature 4, shown in FIG. 3, in order to serially connect electrode groups 21, electrode groups 21 need to insulate from electrically conductive molded article 10 to prevent short circuit between the cathode and the anode. Therefore, the circumferential surface of electrode group 21 accommodated in accommodating cavity 11 needs to be covered with an insulating separator or seal.

However, if electrode groups are covered with insulators, the electrode groups and the molded article do not directly contact each other, so that heat becomes less likely to be conducted from the electrode groups to the molded article.

Therefore, in the power supply apparatus disclosed in Patent Literature 4, even if electrode groups and the molded article contact each other, heat is not sufficiently conducted from the electrode groups to the molded article, and therefore there occur problems of decrease in the performance of unit cells and thermal runaway.

In view of the above-described problems, it is therefore an object of the present invention to provide a power supply apparatus that can prevent decrease in performance and thermal runaway due to increase in temperature.

Solution to Problem

The inventors found that, by directly accommodating an electrode group and electrolytic solution (hereinafter referred to as "unit") in each accommodating cavity in a formed article and contacting the cathode or anode of the electrode group with the formed article, it is possible to effectively cool each unit, and then carried out further studies to accomplish the invention.

That is, the present invention relates to the power supply apparatus shown below.

[1] A power supply apparatus comprising: a formed article having two or more separate accommodating cavities; an electrode group that is formed by rolling up a laminate and is accommodated in each of the accommodating cavities, the laminate composed of a cathode and an anode, each having a current collector and mixture layers disposed on the current collector, and a separator sandwiched between the cathode and the anode; and electrolytic solution accommodated in each of the accommodating cavities, wherein both of the electrolytic solution, and the anode or the cathode contact the formed article.

[2] The power supply apparatus according to claim 1, wherein: the electrode group has a column shape; and the current collector of the anode or the cathode constitutes a circumferential surface of the electrode group.

[3] The power supply apparatus according to one of [1] and [2], wherein the electrode groups are connected in parallel.

[4] The power supply apparatus according to one of [1] to [3], wherein a thermal conductivity of the formed article is equal to or higher than 50 W/mK.

[5] The power supply apparatus according to [3], wherein a material for the formed article includes aluminum, magnesium, iron, nickel, carbon or an alloy thereof.

[6] The power supply apparatus according to one of [1] to [5], wherein the formed article further includes radiation fins.

[7] The power supply apparatus according to one of [1] to [6], wherein the formed article is an extruded article.

Advantageous Effects of Invention

In the power supply apparatus according to the present invention, the cathode or anode of each of electrode groups contacts a formed article having a high thermal conductivity, so that the heat of units is readily conducted to the formed article. Therefore, it is possible to effectively cool each unit to prevent decrease in performance and thermal runaway due to increase in temperature.

BRIEF DESCRIPTION OF DRAWINGS

FIGS. 11A to 11C show a method of manufacturing a formed article;

DESCRIPTION OF EMBODIMENTS

Figure 1:
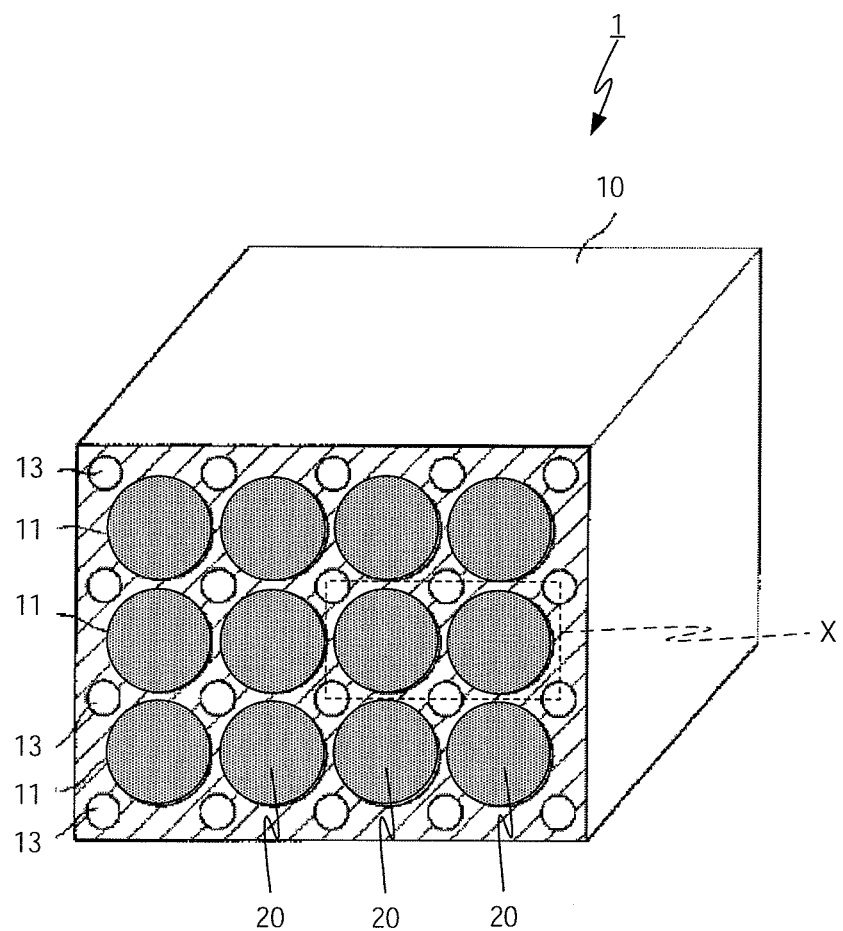
FIG. 1 is a perspective view showing a conventional power supply apparatus.
Figure 2:
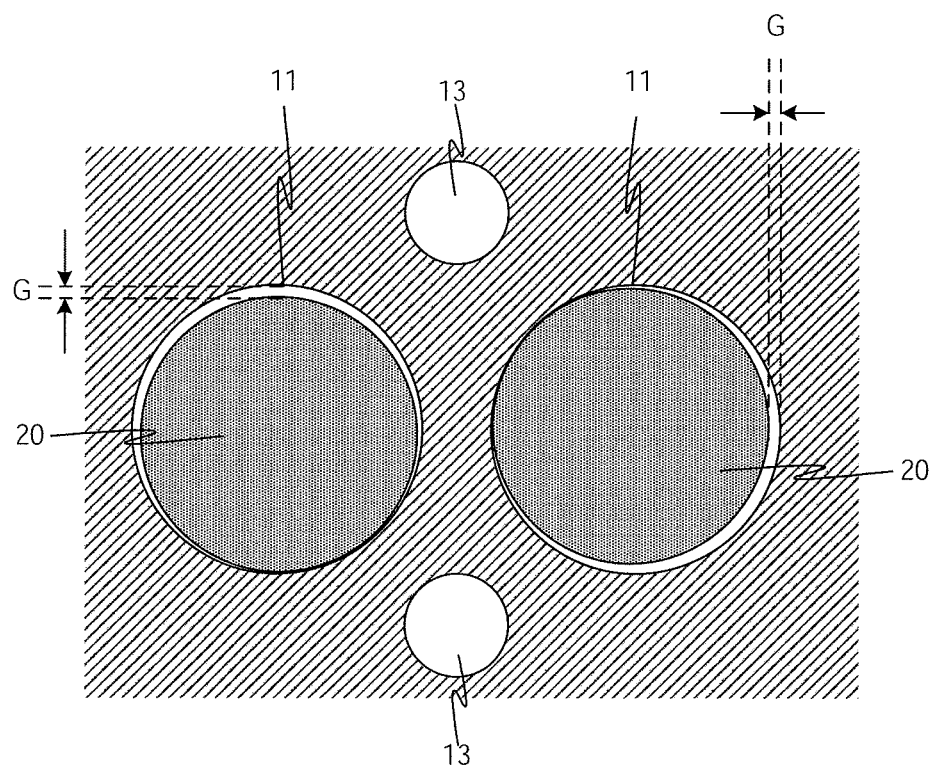
FIG. 2 is an enlarged view showing the conventional power supply apparatus.
Figure 3:
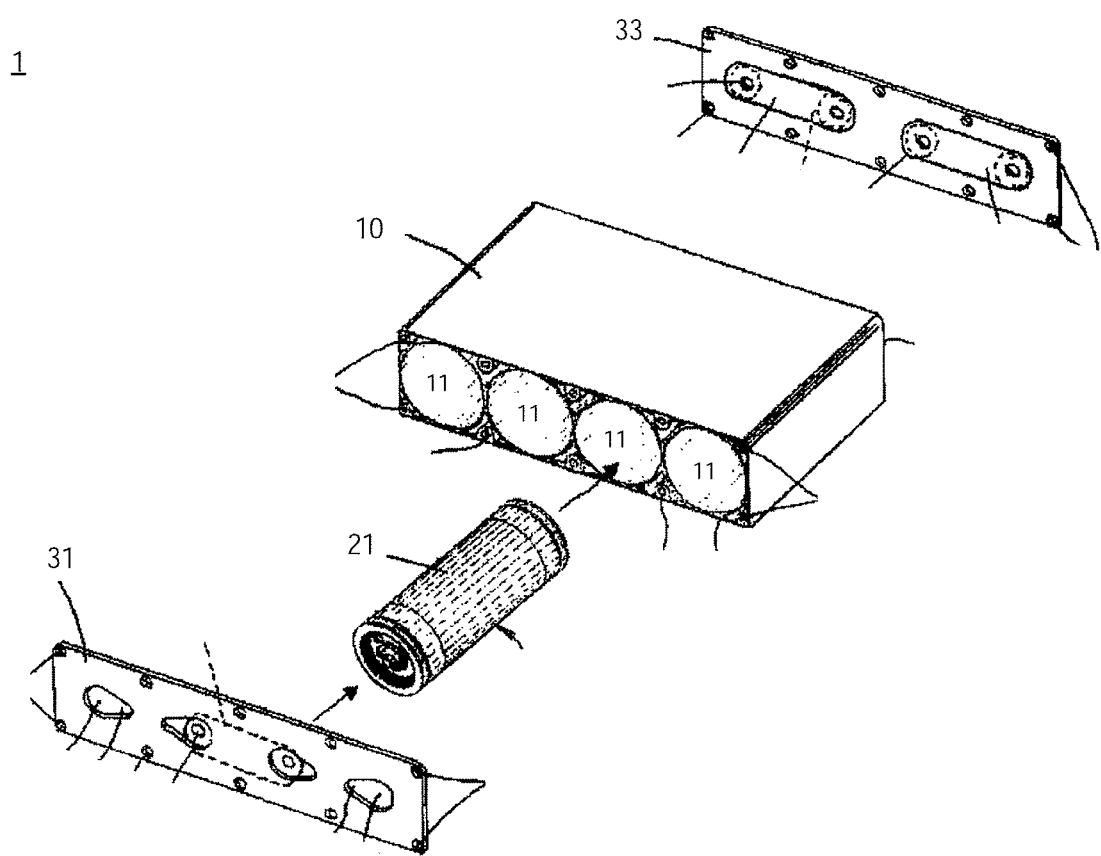
FIG. 3 is an exploded perspective view showing the conventional power supply apparatus.

1. Power Supply Apparatus According to the Present Embodiment

The present invention relates to a power supply apparatus that makes it possible to supply a large current by connecting a plurality of secondary cells (units). The power supply apparatus according to the present invention has 1) a formed article, 2) electrode groups and 3) electrolytic solution. The power supply apparatus according to the present invention is characterized in that each electrode group and electrolytic solution, which are not accommodated in a casing, are directly accommodated in a formed article, and its cathode or anode directly contacts the formed article. In this way, the cathode or anode having a high conductivity directly contacts the formed article, so that the heat of the unit is effectively conducted to the formed article to prevent increase in the heat of the unit. Now, each component will be explained.

1) Formed Article

A formed article is a member for accommodating electrode groups and electrolytic solution described later. The formed article may be electrically conductive or nonconductive. The formed article has a plurality of separate accommodating cavities. Here, "separate" means that accommodating cavities are not in communication with each other to form a liquid junction. The accommodating cavities provided in the formed article may penetrate (see FIG. 10) or not penetrate (see FIG. 14) the formed article. The shape of accommodating cavities is not particularly limited. An accommodating cavity may have a prism shape or cylindrical shape.

In addition, the number of accommodating cavities is selected appropriately, according to the number of electrode groups accommodated in the formed article, that is, the output of the power supply apparatus, and is 10 to 40 in general. Each accommodating cavity accommodates an electrode group and electrolytic solution described later. The electrode group and electrolytic solution accommodated in each accommodating cavity in the formed article serve as a secondary cell, such as a nickel-metal hydride battery, a nickel-cadmium battery, a lithium-ion battery, a lithium-air battery and a zinc-air battery. Hereinafter, an electrode group and electrolytic solution which are accommodated in one cavity in the formed article and serve as a secondary cell, will also be referred to as "unit." Therefore, in the present invention, a formed article has a plurality of units.

The shape of an accommodating cavity is selected appropriately, depending on the shape of an electrode group to be accommodated. For example, when an electrode group has a cylindrical shape, an accommodating cavity correspondingly has a cylindrical column shape, and, when an electrode group has a prismatic column shape, an accommodating cavity correspondingly has a prism shape. When the shape of an accommodating cavity is a prism (e.g. quadratic prism), the contact area between the unit and formed article is large compared to the case where the shape of an accommodating cavity is a cylinder. Therefore, when the shape of an accommodating cavity is a prism, the formed article can more effectively deprive heat from units.

It is preferable to fabricate the formed article with a material having a high thermal conductivity. To be more specific, the thermal conductivity of the material for the formed article is preferably equal to or higher than 1 W/mK, and more preferably equal to or higher than 50 W/mK. Examples of this material for the formed article include aluminum, magnesium, iron, nickel, carbon and alloys thereof. In particular, aluminum alloy such as A6063 has a high thermal conductivity and is easily molded, and therefore is desirable as a material for the formed article. In addition, a material for the formed article may be resin in which carbon nanotubes, carbon graphite and so forth are dispersed.

The formed article has a high thermal conductivity as described above, and therefore has a high heat radiation rate. In addition, in the present invention, the heat radiation rate of the formed article may be improved by forming radiation fins (see FIGS. 5 and 6) and coolant channels in the formed article.

The formed article may further have a built in heater. The formed article having a heater allows use of a power supply apparatus even on a cold day. In addition, a formed article may have holes for adjusting the heat capacity of the formed article, in addition to accommodating cavities (see reference numerals 115 in FIG. 5).

A method of manufacturing a formed article is not particularly limited, but, for example, extrusion molding is preferable. "Extrusion molding" is a method of molding the shape of a material by extruding a heated billet through a die (see FIG. 11C). By using extrusion molding, it is possible to manufacture a formed article at low cost. A member manufactured by extrusion molding is also referred to as "extruded article."

2) Electrode Group

Figure 7A:
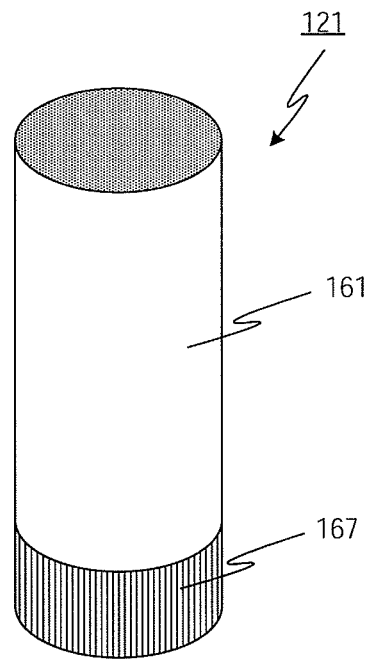
FIGS. 7A and 7B are perspective views showing an electrode group according to Embodiment 1.
Figure 7B:
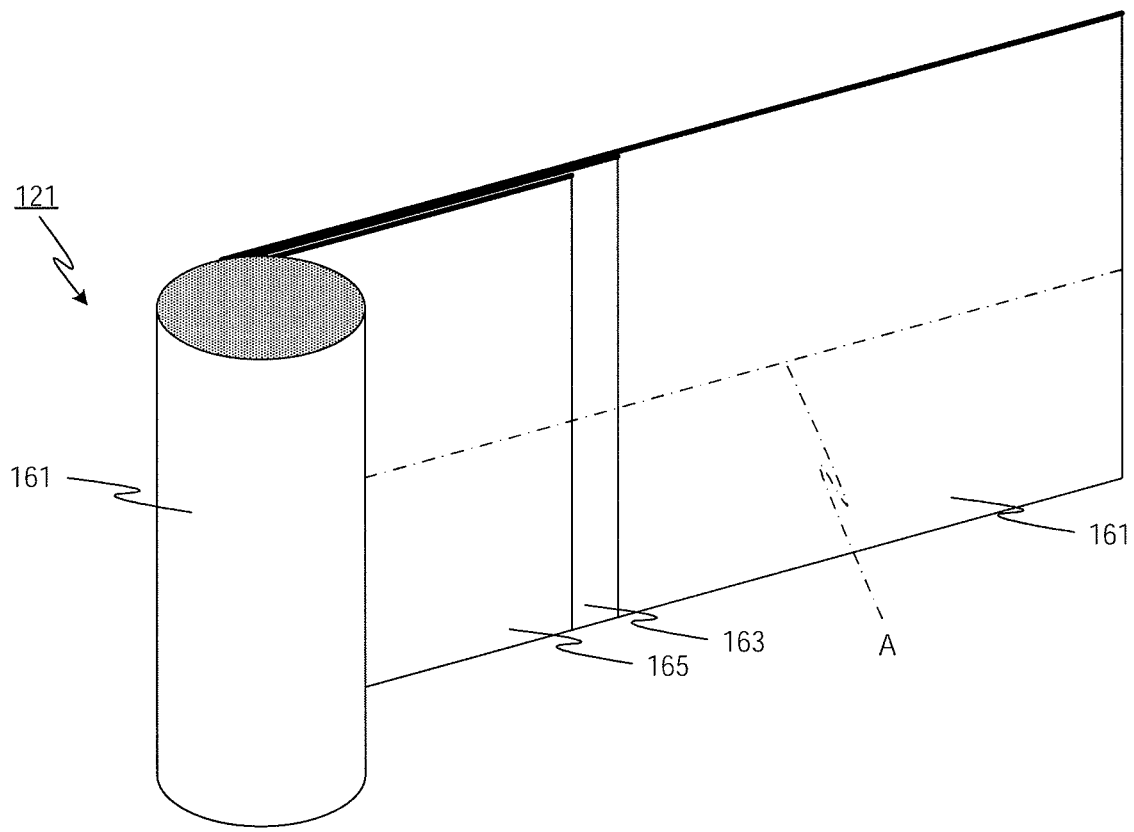

An electrode group is formed by rolling up a laminate composed of a cathode, an anode and a separator disposed between the cathode and the anode (see FIG. 7A and FIG. 7B). The electrode group may be cylindrical or prismatic as long as it has a column shape. As described above, the present invention is characterized in that electrode groups are directly accommodated in accommodating cavities in the formed article. Therefore, in the present invention, electrode groups directly contact the formed article.

Although electrode groups accommodated in respective accommodating cavities in the formed article may be connected in series or in parallel, it is preferable to connect them in parallel. The reason for this is that when electrode groups (units) are connected in parallel, it is possible to supply power, even if one of the units failed to operate, a current from the other working units, so that the reliability of the power supply apparatus is improved. On the other hand, when electrode groups are connected in series, the formed article needs to be electrically nonconductive to prevent short circuit between the cathode and the anode.

The cathode has a cathode current collector and a cathode mixture layer disposed on the cathode current collector. The anode has an anode current collector and an anode mixture layer disposed on the anode current collector.

The cathode current collector supports a cathode mixture layer and the anode current collector supports an anode mixture layer. The cathode current collector and the anode current collector, have a current collecting function. The cathode current collector and the anode current collector are selected appropriately from metallic foil, such as aluminum foil, copper foil and nickel foil, depending on the kinds of units. For example, when a unit serves as a lithium-ion battery, the cathode current collector is aluminum foil and the anode current collector is copper foil. Generally, aluminum foil or aluminum alloy foil having a thickness of 5 to 30 μm is used as a cathode current collector, and copper foil having a thickness of 5 to 25 μm is used as an anode current collector in many cases.

Figure 8:
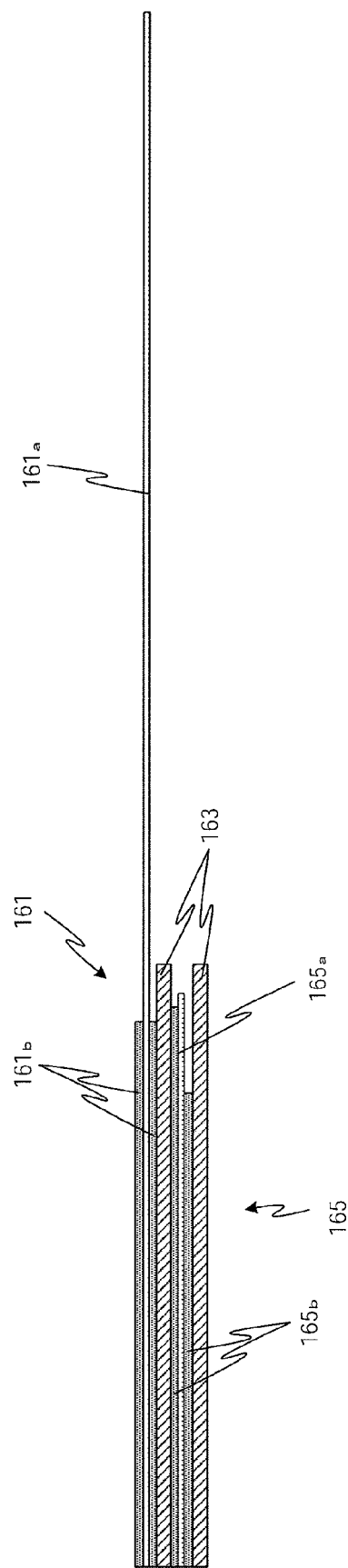
FIG. 8 is a cross sectional view showing an electrode group according to Embodiment 1.

The cathode mixture layer is formed by binding particles of a cathode active material with a binder. The binder binds the particles of active material each other and a current collector and an active material each other. The cathode mixture includes an electrically conductive material, and may further include other substance. In addition, a cathode mixture layer is generally disposed on both surfaces of a cathode current collector as shown in FIG. 8.

The material for particles of a cathode active material is, for example, lithium transition metal oxides such as lithium cobalt oxide, lithium nickel oxide and lithium manganese oxide, transition metal sulfides such as FeS and $TiS_2$, organic compounds such as polyaniline and polypyrrole, and compounds obtained by partial elemental substitution of these compounds. The average particle size of a cathode active material is 1 to 100 μm.

The material for the binder is not particularly limited; examples include thermoplastic resins such as fluorine-containing resins, rubber particle binders having acrylate units, and so forth. Examples of the fluorine-containing resins include polyvinylidne fluoride (PVDF) or its modified form, polytetrafluoroethylene (PTFE) and so forth. The material for the binder may further contain an acrylate monomer or acrylate oligomer into which a reactive functional group is introduced.

Examples of an electrically conductive material include carbon blacks such as acetylene black, ketjen black, channel black, furnace black, lamp black, thermal black and so forth, and various graphites.

The anode mixture layer is a layer formed by binding particles of an anode active material with a binder. The anode mixture layer contains an electrically conductive material and may further contain other substances. In addition, as shown in FIG. 8, the anode mixture layer is generally disposed on both surfaces of the anode current collector.

The material for an anode active material includes, for example, carbonaceous active materials such as graphites, cokes and so forth; lithium metals; lithium transition metal nitrides; and silicon-based composite materials such as silicides and so forth. Examples of the material for a binder contained in the anode mixture layer include polyvinylidne fluoride (PVDF) and its modified form, styrene-butadiene copolymer rubber particles (SBR) and their modified forms, and so forth. In addition, the electrically conductive material contained in the anode mixture layer may be the same as the electrically conductive material contained in the cathode mixture layer.

The separator is a member to insulate between the cathode and the anode and assure ionic conductivity between the cathode and the anode. The material for the separator is not particularly limited as long as it is stable during the operation of the power supply apparatus, and is, for example, an insulating porous polymer film. The separator may be formed, for example, by applying, drying and rolling a mixture composed of inorganic particles, organic particles or a mixture of inorganic particles and organic particles; a binder; a solvent; various additives; and so forth. The inorganic particles include alumina, silica, magnesium oxide, titanium oxide, zirconia, silicon carbide, silicon nitride and so forth. The organic particles include polyethylene, polypropylene, polystyrene, polyacrylonitrile, polymethylmethacrylate, polyvinylidene fluoride, polytetrafluoroethylene, polyimide and so forth. The thickness of the separator is not particularly limited, and for example, is 10 to 25 μm.

As described above, the present invention is characterized in that one of the cathode and the anode of an electrode group contacts the formed article. Therefore, for example, when the formed article has electrical conductivity, one of the cathode and the anode is electrically connected to the formed article. Consequently, when the formed article has electrical conductivity, the formed article serves as the cathode or anode, and electrode groups are connected in parallel.

In order to make one of the anode and the cathode of an electrode group contact the formed article, the anode or the cathode constitutes the circumferential surface of a column-shaped electrode group (see FIG. 7A). In this way, an electrode having a high thermal conductivity, not a separator having a low thermal conductivity, contacts the formed article, so that the heat of the electrode group is readily conducted to the formed article.

In addition, in the present invention, it is preferable that the anode or cathode current collector, instead of the anode or cathode mixture layer, contacts the formed article. Therefore, it is preferable that the anode current collector or the cathode current collector constitutes the circumferential surface of a column-shaped electrode group. A current collector having a higher thermal conductivity than a mixture layer contacts the formed article, so that the heat of an electrode group is more readily conducted to the formed article. If a cathode or anode mixture layer having a relatively low strength is exposed on the circumferential surface of an electrode group, an electrode of the electrode group might be damaged when it is inserted into the formed article.

3) Electrolytic Solution

Electrolytic solution contains a solvent and electrolyte. As described above, the present invention is characterized in that electrolytic solution is directly accommodated in accommodating cavities in the formed article. Therefore, in the present invention, electrolytic solution contacts the formed article.

A solvent is selected appropriately depending on the kinds of units. For example, when a unit serves as a lithium-ion battery, the solvent is a nonaqueous solvent. Examples of the nonaqueous solvent include, ethylene carbonate, propylene carbonate, butylene carbonate, dimethyl carbonate, methylethyl carbonate, diethyl carbonate, γ-butyrolactone, sulfolane, acetonitrile, 1,2-dimethoxyethane, 1,3-dimethoxypropane, diethyl ether, tetrahydrofuran, 2-methyltetrahydrofuran, γ-butyrolactone and so forth. These nonaqueous solvents may be used alone or in combination.

Meanwhile, when a unit serves as a nickel-metal hydride battery, a nickel-cadmium battery, a zinc-air battery, a lithium-air battery and so forth, the solvent is water.

Electrolyte is also selected appropriately depending on the kinds of units. For example, when a unit functions as a lithium-ion battery, examples of the electrolyte include lithium salts such as lithium perchlorate ($LiClO_4$), lithium phosphate hexafluoride ($LiPF_6$), lithium fluoroborate ($LiBF_4$), lithium arsenic hexafluoride ($LiAsF_6$), lithium trifluoromethasulfonate ($LiCF_3SO_3$), bistrifluoromethyl sulfonylimide lithium [$LiN(CF_3SO_2)_2$] and so forth.

Meanwhile, a unit serves as a nickel-metal hydride battery, a nickel-cadmium battery, a zinc-air battery and so forth, examples of the electrolyte include potassium hydroxide and so forth.

4) Others

Figure 10:
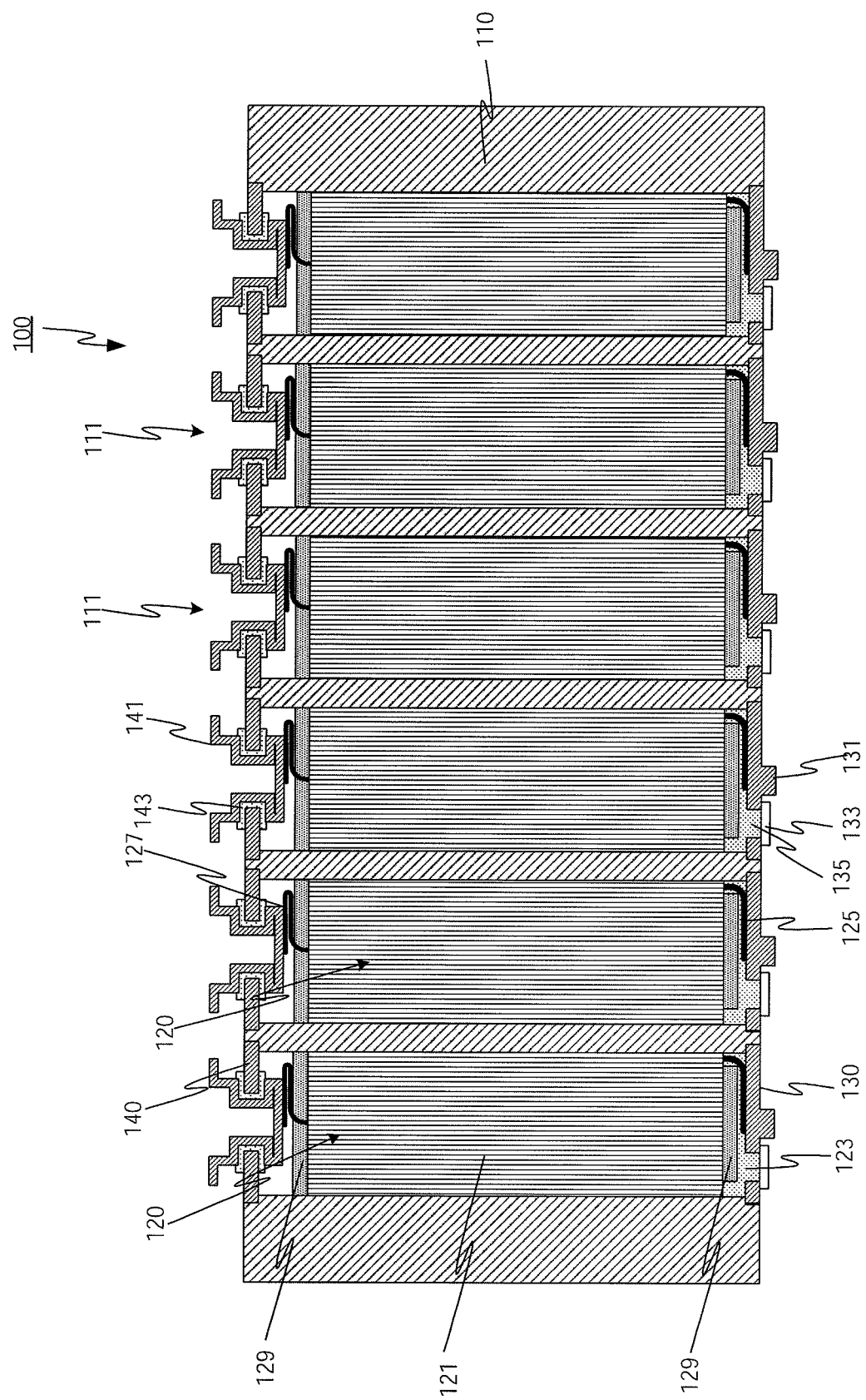
FIG. 10 is a cross sectional view showing the power supply apparatus according to Embodiment 1.
Figure 13:
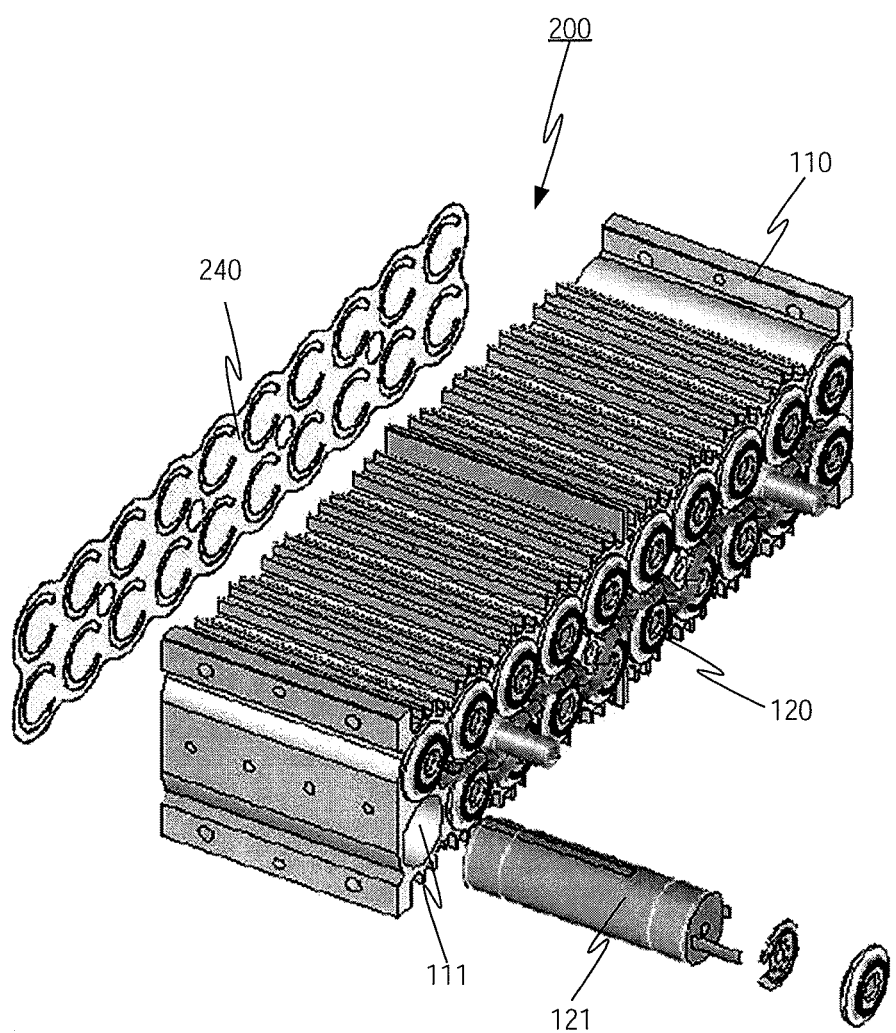
FIG. 13 is an exploded perspective view showing a power supply apparatus according to Embodiment 2.

The power supply apparatus according to the present invention further includes sealing plates that seal accommodating cavities in the formed article (see FIG. 10 and FIG. 13). A sealing plate may be provided with an explosion-proof valve to release the pressure from a unit when the pressure in the unit increases due to the generation of heat (see FIG. 10).

In addition, the power supply apparatus according to the present invention may have a temperature control mechanism including a temperature sensor and a heater or cooler. The temperature control mechanism can prevent the temperature of the power supply apparatus from increasing too high and decreasing too low.

The voltage of the power supply apparatus formed as described above is usually 1.2 to 3.7 V and the capacity is 25 to 120 Ah. If a greater voltage or output is required, a plurality of power supply apparatuses according to the present invention may be connected. For example, in a car power supply apparatus requiring a large current, fourteen modules, each having seven power supply apparatuses according to the present invention connected in series, are connected in parallel.

During use of the power supply apparatus according to the present invention, each unit discharges to supply current. At this time, some of the energy provided from each unit is converted to heat. Therefore, during use of the power supply apparatus, each unit generates heat. If a unit generates and retains heat therein, the temperature of the unit increases and therefore the performance of the unit decreases.

As described above, in the present embodiment, a unit is directly accommodated in an accommodating cavity in the formed article, and the cathode or anode having a high thermal conductivity contacts the formed article. Therefore, the heat of units is effectively conducted to the formed article. By this means, units are readily deprived of the heat by the formed article and therefore effectively cooled.

The heat conducted from units to the formed article is discharged from the formed article to the outside. As described above, in the present invention, the heat radiation rate of the formed article is high, so that the heat conducted to the formed article is readily discharged outside and therefore the temperature of the formed article itself does not become high.

2. the Heat Capacity of the Power Supply Apparatus According to the Present Invention It is preferable that the power supply apparatus according to the present invention has a large capacity. To be more specific, it is preferable that the heat capacity of the power supply apparatus according to the present invention is equal to or greater than 475 J/K. The mass of the formed article may be increased or the number of units may be increased to adjust the heat capacity of the power supply apparatus. The heat capacity of one unit is about 35 J/K. For example, when the mass of a formed article made of aluminum is equal to or greater than 480 g and the number of units is equal to or greater than 10, it is possible to obtain a power supply apparatus whose output per unit volume is high heat capacity is large. Now, an advantage of the power supply apparatus having a large heat capacity will be explained.

When short circuit occurs between the cathode and the anode of a unit due to foreign materials such as metal chips mixed in an electrode group, most of the energy of the unit might be converted to heat. If most of the energy of a unit is converted to heat due to short circuit, the unit rapidly generates heat, and therefore thermal runaway may occur. As used herein, "thermal runaway" refers to a situation where temperature control fails due to temperature rise caused by a positive feedback loop of heat generation. To be more specific, if thermal runaway occurs, the cathode is decomposed to discharge oxygen, and electrolytic solution is oxidized and decomposed to generate much more heat. Generally, when the temperature of a lithium-ion battery exceeds about 150° C., thermal runaway might occur.

An occurrence of thermal runaway might be prevented by air-cooling the heat generated in the units due to short circuit. However, as heat generation due to short circuit occurs in a very short time, air cooling is insufficient to completely cool the units.

Though, as described above, the heat capacity of the power supply apparatus according to the present invention is large, equal to or greater than 475 J/K, and therefore, if short circuit occurs between the cathode and the anode of one unit and then the energy of the unit is converted to heat, the heat from the unit is absorbed in the overall power supply apparatus. Consequently, it is possible to prevent the temperature of the power supply apparatus from rising to equal to or higher than 150° C. and thus to prevent an occurrence of thermal runaway.

For example, when the voltage and the capacity of one unit are 3.6 V and 4 Ah, respectively, the energy of that unit is:

$$3.6\ V \times 4\ Ah = 14.4\ Wh = 51836\ J.$$

Therefore, when the heat capacity of the power supply apparatus is equal to or more than 475 J/K, even if all the energy of one unit is converted to heat, an increase in temperature of the power supply apparatus is equal to or lower than 51836 J/475 J/K=109.1 K.

Therefore, even if the environmental temperature is 40° C., the temperature of the power supply apparatus is kept equal to or lower than 150° C. (40° C.+109.1° C.=149.1° C.), and therefore it is possible to prevent thermal runaway.

Now, embodiments of the present invention will be described with reference to the accompanying drawings, and here, the present invention is not limited to illustrated embodiments.

Embodiment 1

Figure 4:
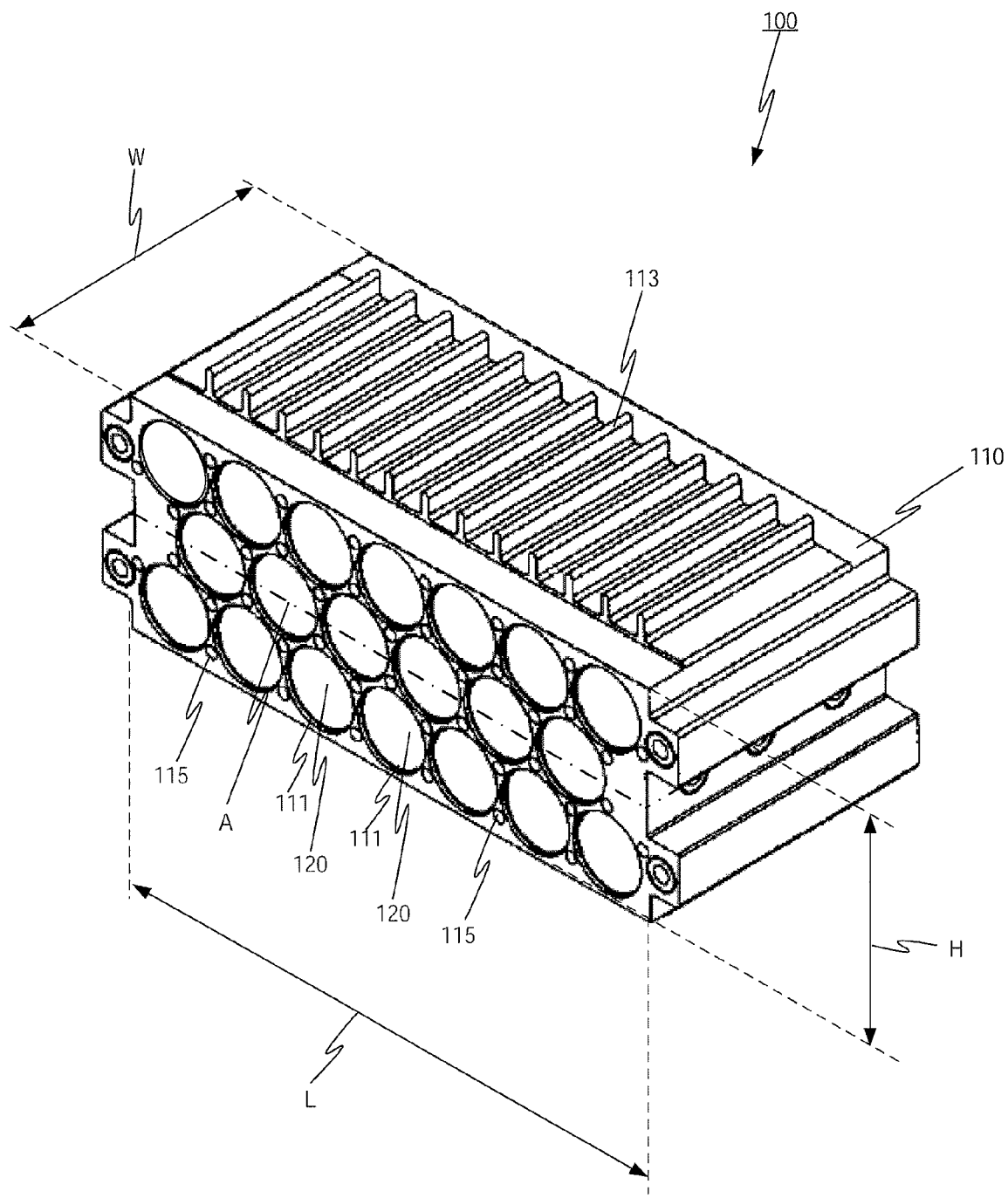
FIG. 4 is a perspective view showing a power supply apparatus according to Embodiment 1.

FIG. 4 is a perspective view showing power supply apparatus 100 according to Embodiment 1.

Figure 5:
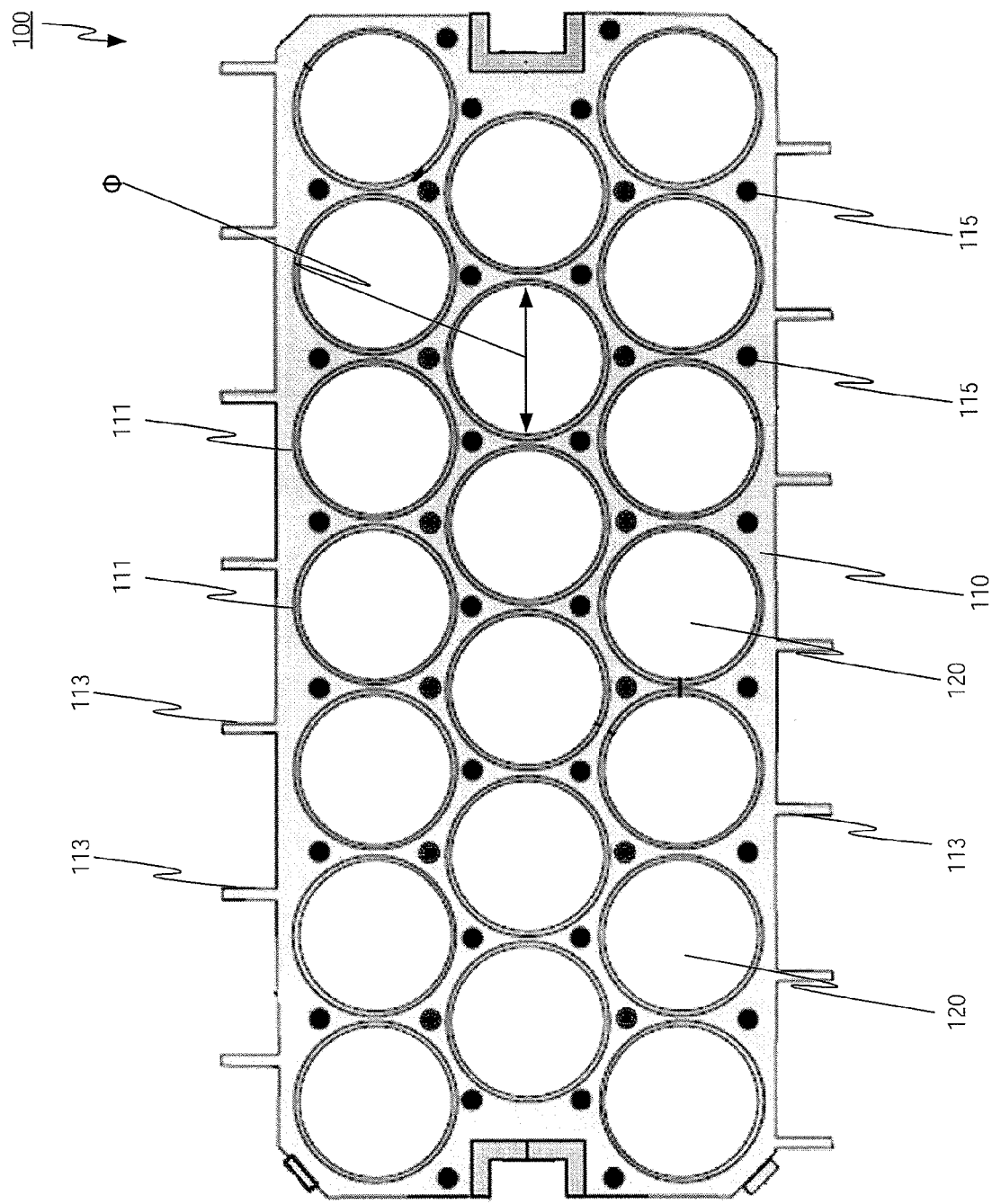
FIG. 5 is a front view showing the power supply apparatus according to Embodiment 1.

FIG. 5 is a front view showing power supply apparatus 100 according to Embodiment 1.

As shown in FIG. 4 and FIG. 5, power supply apparatus 100 has formed article 110 and units 120. Moreover, power supply apparatus 100 has cathode sealing plates 130 and anode sealing plates 140 (see FIG. 10).

Formed article 110 is an electrically conductive member made of, for example, aluminum. Formed article 110 has a plurality of accommodating cavities 111. Accommodating cavities 111 penetrate formed article 110. Units 120 are accommodated in accommodating cavities 111.

The dimensions of formed article 110 are not particularly limited, but, for example, length L is 140 to 180 mm; width W is 50 to 90 mm; and height H is 40 to 80 mm (see FIG. 4). In addition, diameter Φ of an accommodating cavity is 10 to 30 mm (see FIG. 5).

Figure 6A:
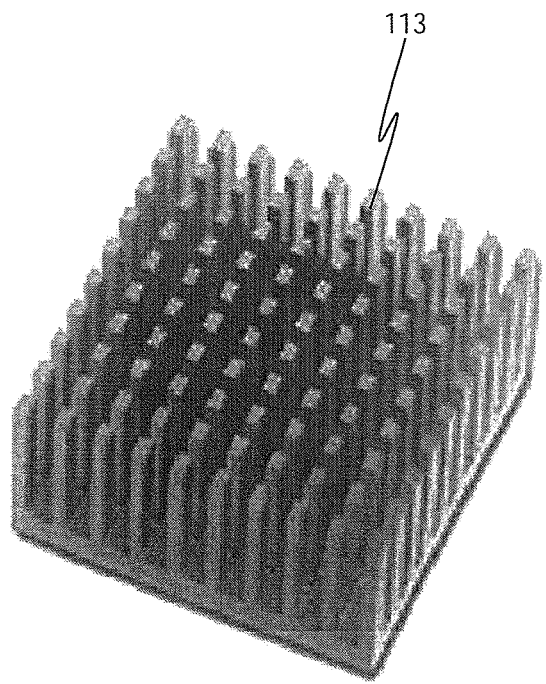
FIGS. 6A and 6B show radiation fins in the power supply apparatus according to Embodiment 1.
Figure 6B:
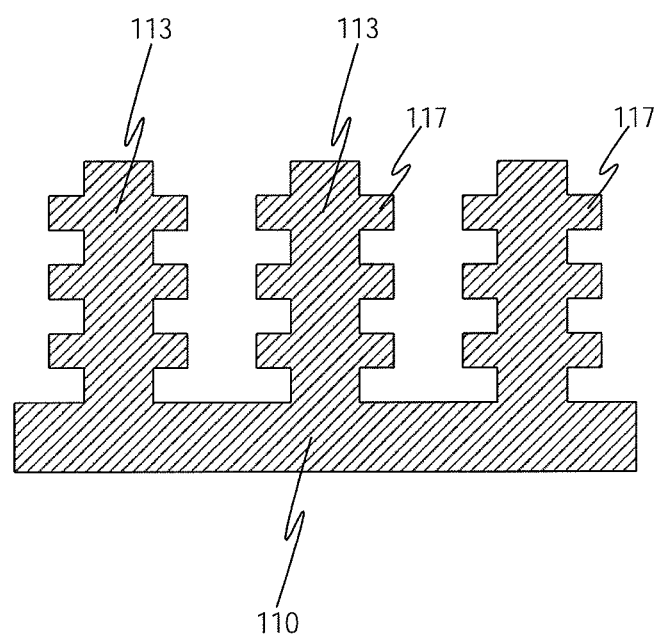

Formed article 110 has a plurality of radiation fins 113 (see FIG. 4 and FIG. 5). Although a case in which formed article 110 has plate-like radiation fins, is shown in FIG. 4 and FIG. 5 as an example, formed article 110 may have rod-like radiation fins 113 as shown in FIG. 6A. Rod-like radiation fins have a greater surface area than plate-like radiation fins, and therefore can improve the heat radiation rate of formed article 110. In addition, as shown in FIG. 6B, the surface area of radiation fins 113 may be increased by providing radiation fin 113 with a plurality of protrusions 117.

Moreover, formed article 100 has a plurality of holes 115 (see FIG. 4 and FIG. 5). Although holes 115 may be hollow, nichrome rods may be inserted into holes 115. The nichrome rods inserted into holes 115 can serve as heaters to warm the power supply apparatus on cold days. In addition, holes 115 may be filled with water, gel, carbon, iron, copper and so forth to adjust the heat capacity of formed article 110. Holes 115 may serve as coolant channels.

Unit 120 is accommodated in accommodating cavity 111, and has electrode group 121 and electrolytic solution 123 (see FIG. 10).

FIG. 7A is a perspective view showing electrode group 121. As shown in FIG. 7A, electrode group 121 has a cylindrical shape. Cathode 161 constitutes the circumferential surface of electrode group 121. Therefore, with the present embodiment, cathode 161 contacts formed article 110, and therefore is electrically connected to formed article 110.

FIG. 7B is an exploded perspective view showing electrode group 121. As shown in FIG. 7B, electrode group 121 is formed by winding a laminate composed of sheet-like cathode 161, sheet-like separator 163 and sheet-like anode 165.

FIG. 8 is a cross sectional view taken along dash dotted line A of FIG. 7B, showing cathode 161, separators 163 and anode 165. As shown in FIG. 8, cathode 161 is composed of current collector 161a and mixture layers 161b sandwiching current collector 161a, and anode 165 is composed of current collector 165a and mixture layers 165b sandwiching current collector 165a.

As shown in FIG. 8, with the present embodiment, current collector 161a of cathode 161 is longer than separators 163 and anode 165. In this way, current collector 161a of cathode 161 is longer than separators 163 and anode 165, so that it is possible to form the circumferential surface of electrode group 121 with current collector 161a of cathode 161, and therefore it is possible to make current collector 161a of cathode 161 having a higher heat radiation rate than a mixture layer contact formed article 110.

In addition, it is preferable to cover one end of electrode group 121 with a cap, insulating tape 167 and so forth. It is preferable that the covered end of electrode group 121 is the apical end of electrode group 121 in the direction to insert electrode group 121 into formed article 110. By this means, when electrode group 121 is inserted into formed article 110, it is possible to prevent an electrode from being damaged.

Figure 9D:
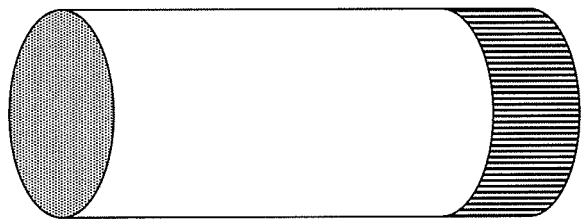
FIGS. 9A to 9D show a method of protecting an end of an electrode group with an insulating tape.
Figure 9C:
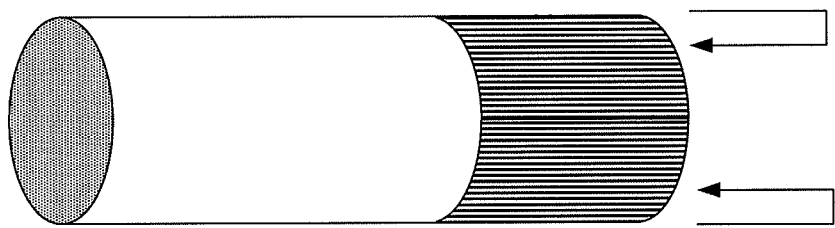
Figure 9B:
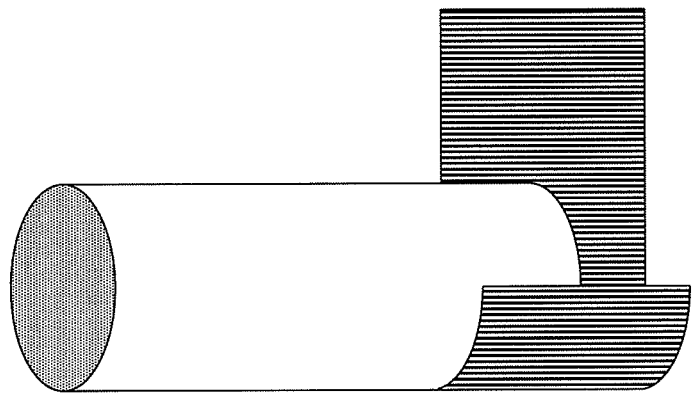
Figure 9A:
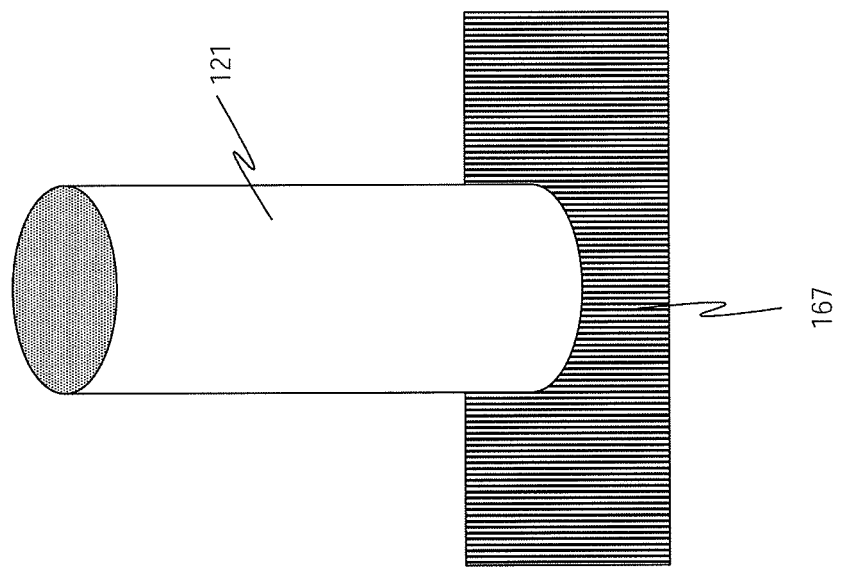

In order to cover one end of electrode group 121 with insulating tape 167, as shown in FIG. 9A to FIG. 9D, one end of electrode group 121 is wrapped with insulating tape 167 (FIG. 9A to FIG. 9C), and part of insulating tape 167, which protrudes from electrode group 121, may be folded (FIG. 9C and FIG. 9D).

FIG. 10 is a cross sectional view showing power supply apparatus 100 shown in FIG. 4, taken along dash dotted line A. As shown in FIG. 10, electrode group 121 and electrolytic solution 123 contact formed article 110. In addition, unit 120 has insulating plates 129 that prevents short circuit between the cathode and the anode. Accommodating cavity 111 accommodating unit 120 is sealed with cathode sealing plate 130 and anode sealing plate 140.

Cathode sealing plate 130 has cathode terminal 131, explosion-proof valve 133 and electrolytic solution supply hole 135. In addition, although it is preferable to connect cathode sealing plate 130 with cathode lead 125 extending from the cathode of electrode group 121, cathode lead 125 is not necessarily required. This is because cathode 161 of an electrode group directly contacts formed article 100 as described above, and consequently cathode 161 is electrically connected with cathode sealing plate 130 connected to formed article 110.

Anode sealing plate 140 has anode terminal 141 and gasket 143. Gasket 143 insulates anode terminal 141. Anode terminal 141 is connected to anode lead 127 extending from the anode of electrode group 121. Anode lead 127 is made of, for example, nickel.

In this way, with the present embodiment, electrode group 121 is directly accommodated in formed article 110, and current collector 161a of cathode 161 having a high thermal conductivity contacts formed article 110. Therefore, during the operation of power supply apparatus 100, unit 120 is deprived of the heat by formed article 110 and therefore effectively cooled. Consequently, according to the present embodiment, it is possible to prevent decrease in the performance of units and thermal runaway due to increase in temperature.

In addition, with the present embodiment, units 120 are directly accommodated in formed article 110, so that the number of members interposed between electrode terminals and electrode groups that actually produce electric power, is small. Therefore, it is possible to obtain a current from units 120 without loss. By contrast with this, a conventional power supply apparatus in which unit cells, each having an electrode group, electrolytic solution, and a casing to accommodate the electrode group and electrolytic solution, are inserted in a formed article (see Patent Literature 3), might lose a current because a member such as a casing intervenes between an electrode group and the electrode terminals.

Next, a method of manufacturing power supply apparatus 100 according to the present embodiment will be described, with reference to FIG. 11A to FIG. 11C and FIG. 12A to FIG. 12C.

Figure 12C:
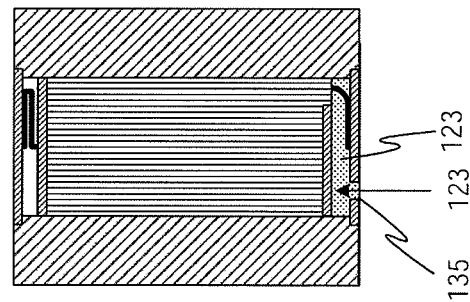
FIGS. 12A to 12C show a method of manufacturing the power supply apparatus according to Embodiment 1.

The method of manufacturing power supply apparatus 100 includes, for example, 1) a first step of providing formed article 110 (see FIGS. 11A to 11C); 2) a second step of inserting electrode group 121 into accommodating cavity 111 in formed article 110 (FIG. 12A); 3) a third step of sealing accommodating cavity 111 with a sealing plate (FIG. 12B); and 4) a fourth step of injecting electrolyte solution 123 from electrolyte solution supply hole 135 into accommodating cavity 111 (FIG. 12C). Now, each step will be described.

In the first step, formed article 110 is provided. Formed article 110 may be provided by manufacturing formed article 110 by extrusion molding. A method of manufacturing a formed article by extrusion molding includes the steps of: for example, inserting aluminum billet 150 heated to an optimal temperature into pressure-resistant container 151 (see FIG. 11A); and pressing inserted aluminum billet 150 with dummy block 153, in the direction of die 155 (see FIGS. 11B and 11C). It is preferable that the temperature of aluminum billet 150 inserted into container 151 is about 400° C.

By pressing aluminum billet 150 with dummy block 153 in the direction of die 155, aluminum billet 150 is extruded from die hole 157 (see FIG. 11B), and therefore formed article 110 having a desired shape is manufactured (see FIG. 11C).

Figure 12B:
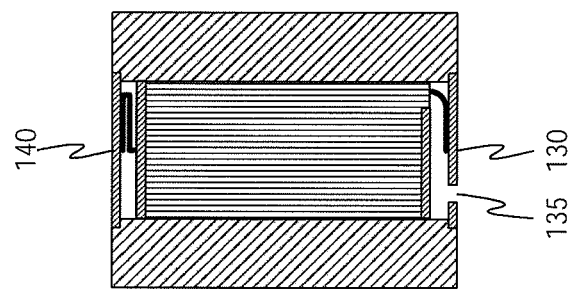
Figure 12A:
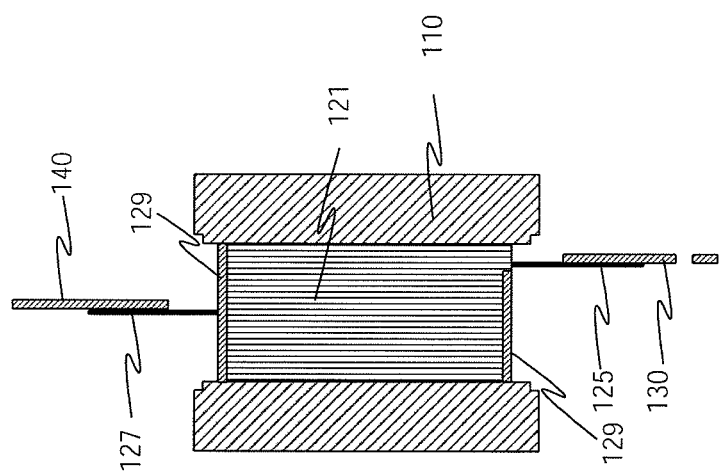

FIG. 12A shows the second step. As shown in FIG. 12A, in the second step, electrode group 121 is inserted into accommodating cavity 111 in formed article 110. Electrode group 121 has cathode lead 125 and anode lead 127. As shown in FIG. 12A, cathode sealing plate 130 may be connected to cathode lead 125 in advance, and anode sealing plate 140 may be connected to anode lead 127 in advance.

As described above, with the present embodiment, cathode 161 constitutes the circumferential surface of electrode group 121, so that the tip of cathode 161 in the direction to insert electrode group 121 might be damaged when electrode group 121 is inserted into accommodating cavity 111 in formed article 110. However, like in the present embodiment, the tip of cathode 161 in the direction to insert electrode group 121 is covered with insulating tape 167 (see FIG. 7A), so that it is possible to prevent the tip of cathode 161 in the direction to insert electrode group 121 from being damaged when electrode 121 is inserted. In addition, with the present embodiment, the circumferential surface of electrode group 121 is constituted by, not a mixture layer having a low strength, but a current collector having a relatively high strength. Therefore, cathode 161 is less likely to be damaged.

FIG. 12B shows the third step. As shown in FIG. 12B, in the third step, cathode sealing plate 130 and anode sealing plate 140 are connected to formed article 110 to seal accommodating cavity 111. Examples of means for connecting sealing plates to a formed article include laser welding, crimping, coining, ultrasonic welding, hot welding, brazing, pressing, friction bonding, screwing and so forth. From the viewpoint of preventing leakage of electrolyte solution, it is preferable to weld sealing plates to formed article 110 by laser welding.

FIG. 12C shows the fourth step. As shown in FIG. 12C, in the fourth step, electrolyte solution 123 is injected from electrolyte solution supply hole 135 into cathode sealing plate 130. After that, electrolyte solution supply hole 135 is blocked with explosion-proof valve 133, so that power supply apparatus 100 according to Embodiment 1 is manufactured.

Embodiment 2

With Embodiment 1, a configuration has been described where cathode sealing plates are separated from each other. With Embodiment 2, a configuration will be described where the power supply apparatus has one cathode sealing plate that covers all accommodating cavities.

FIG. 13 is an exploded perspective view showing power supply apparatus 200 according to Embodiment 2. Power supply apparatus 200 is the same as power supply apparatus 100 according to Embodiment 1 shown in FIG. 4, except that cathode sealing plates are connected. The same components as in power supply apparatus 100 according to Embodiment 1 are assigned the same reference numerals and descriptions will be omitted.

As shown in FIG. 13, power supply apparatus 200 has one cathode sealing plate 240. In this way, with the present embodiment, cathode sealing plate 240 is not separated for each unit 120, so that it is possible to manufacture more simply the power supply apparatus with lesser parts.

Embodiment 3

With Embodiment 1 and Embodiment 2, a configuration in which accommodating cavities penetrate a formed article, has been described. With Embodiment 3, a configuration in which accommodating cavities do not penetrate a formed article, will be described.

Figure 14:
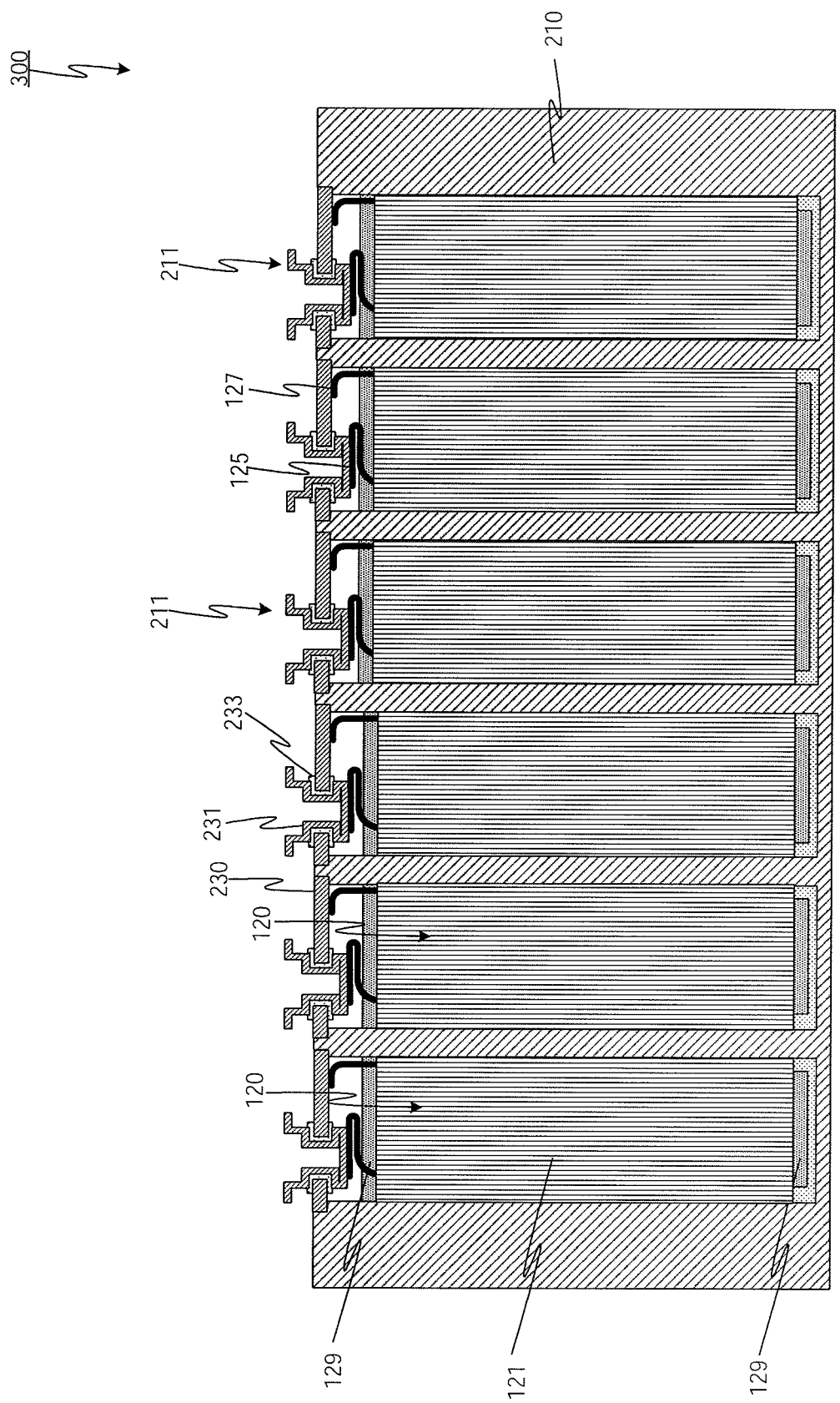
FIG. 14 is a cross sectional view showing a power supply apparatus according to Embodiment 3.

FIG. 14 is a cross sectional view showing power supply apparatus 300 according to Embodiment 3. Power supply apparatus 300 is the same as power supply apparatus 100 according to Embodiment 1 shown in FIG. 10 except that the shape of accommodating cavities 211 differs. The same components as in power supply apparatus 100 according to Embodiment 1 are assigned the same reference numerals and descriptions will be omitted.

As shown in FIG. 14, power supply apparatus 300 has formed article 210 and sealing plates 230. Formed article 210 has accommodating cavities 211. Accommodating cavities 211 do not penetrate formed article 210. It is possible to mold such a formed article 210 by, for example, impact molding.

Sealing plate 230 has anode terminal 231. Anode terminal 231 is connected to anode lead 127. Anode terminal 231 is insulated using gasket 233.

As described above, with the present embodiment, a formed article is manufactured by impact molding, so that it is possible to manufacture more simply the power supply apparatus.

The present application claims the priority of Japanese Patent Application No. 2010-022296 filed on Feb. 3, 2010, the entire contents of which are herein incorporated by reference.

INDUSTRIAL APPLICABILITY

The power supply apparatus according to the present invention is suitable for use as a power supply apparatus for vehicles, such as a fork lift, a hybrid car, an electric car and so forth, a backup power supply for electronic devices and a home battery charging apparatus.

REFERENCE SIGNS LIST 100, 200, 300 Power supply apparatus
110, 210 Formed article
111, 211 Accommodating cavity
113 Radiation fin
115 Hole
117 Protrusion
120 Unit
121 Electrode group
123 Electrolyte solution
125 Cathode lead
127 Anode lead
129 Insulating plate
130, 240 Cathode sealing plate
131 Cathode terminal
133 Explosion-proof valve
135 Electrolyte solution supply hole
140 Anode sealing plate
141 Anode terminal
143 Gasket
150 Aluminum billet
151 Container
153 Dummy block
155 Die
157 Die hole
161 Cathode
163 Separator
165 Anode
167 Insulating tape
230 Sealing plate
231 Anode terminal
233 Gasket

The invention claimed is:

1. A power supply apparatus comprising:
a formed article having two or more accommodating cavities;
an insulating tape;
an electrode group that comprises a rolled up laminate and is accommodated in each of the accommodating cavities, the laminate comprises a cathode and an anode, each having a current collector and mixture layers disposed on the current collector, and a separator sandwiched between the cathode and the anode, the electrode group having a column shape, and the anode current collector or the cathode current collector defining a circumferential surface of the electrode group;
a side face of only one of the end parts of the column of the electrode group being covered by the insulating tape; and the insulating tape extends into each of the accommodating cavities; and
electrolytic solution accommodated in each of the accommodating cavities, wherein
both of the electrolytic solution, and the anode or the cathode contact the formed article,
and the covered side face of one end part of the column of the electrode comprising a forward end of the electrode group in an insertion direction of the electrode group into an accommodating cavity of the formed article.

2. The power supply apparatus according to claim 1, wherein the electrode groups are connected in parallel.

3. The power supply apparatus according to claim 2, wherein a material of the formed article includes aluminum, magnesium, iron, nickel, carbon or an alloy thereof.

4. The power supply apparatus according to claim 1, wherein a thermal conductivity of the formed article is equal to or higher than 50 W/mK.

5. The power supply apparatus according to claim 1, wherein the formed article further includes radiation fins.

6. The power supply apparatus according to claim 1, wherein the formed article is an extruded article.

7. The power supply apparatus according to claim 1, the current collector comprising an outermost circumferential surface of the electrode group.

8. The power supply apparatus according to claim 1, the current collector being longer, in a rolled up direction, than the separator.

9. The power supply apparatus according to claim 1, further comprising a cover member that covers each accommodating cavity at an end of the electrode group opposite to the one end part.

10. The power supply apparatus according to claim 1, the insulating tape being configured to be accommodated in the accommodating cavity concurrently with accommodation of the electrode group in the accommodating cavity.

11. The power supply apparatus according to claim 1, the insulating tape contactingly engaging the side face of the one end part of the electrode group.

12. A power supply apparatus comprising:
a formed article having two or more accommodating cavities;
an insulating tape;
an electrode group that comprises a rolled up laminate and is accommodated in each of the accommodating cavities, the laminate comprises a cathode and an anode, each having a current collector and mixture layers disposed on the current collector, and a separator sandwiched between the cathode and the anode, the electrode group having a column shape, and the anode current collector or the cathode current collector defining a circumferential surface of the electrode group;

a side face of only one of the end parts of the column of the electrode group being covered by the insulating tape; and the insulating tape extends into each of the accommodating cavities; and electrolytic solution accommodated in each of the accommodating cavities, wherein both the electrolytic solution, and the anode or the cathode contact the formed article, and each of the cavities having a top portion configured to receive an electrode group, and a bottom portion, the side face covered by the insulation tape being positioned adjacent to the bottom portion of the cavity.

13. The power supply apparatus according to claim 12, further comprising a cover member covering the top portion of the cavity.

* * * * *